United States Patent
Adams

[15] 3,678,044
[45] July 18, 1972

[54] SUBSTITUTED FLAVANONES

[72] Inventor: John Howard Adams, San Rafael, Calif.

[73] Assignee: Chevron Research Company, San Francisco, Calif.

[22] Filed: Oct. 22, 1970

[21] Appl. No.: 83,209

Related U.S. Application Data

[63] Continuation-in-part of Ser. No. 779,626, Nov. 27, 1968.

[52] U.S. Cl.................260/240 F, 117/132 R, 117/132 C, 260/41 C, 260/93.7, 260/345.2, 260/591

[51] Int. Cl. .............................................C07d 7/34

[58] Field of Search............................................260/240 F

[56] References Cited

OTHER PUBLICATIONS

Adams, J. Org. Chem. vol. 32, pages 3992–8 (Dec. 1967).

*Primary Examiner*—John D. Randolph
*Attorney*—A. L. Snow, F. E. Johnston, G. F. Magdeburger and John Stoner, Jr.

[57] ABSTRACT

Substituted arylidene flavanones are provided which are useful as oxidation inhibitors for hydrocarbon compositions.

6 Claims, No Drawings

SUBSTITUTED FLAVANONES

CROSS-REFERENCE TO RELATED APPLICATION

This application is a continuation-in-part of copending U.S. application Ser. No. 779,626, filed Nov. 27, 1968.

BACKGROUND

Hydrocarbons in general are subject to oxidation which may result in degradation of the hydrocarbon molecules. In particular, polymeric materials such as substantially crystalline poly-1-olefins, for example polypropylene, are subject to oxidative deterioration at the elevated temperatures normally employed in the manufacture and use of polymeric thermoplastic products from such materials.

Certain substituted chalcones and flavanones are effective when incorporated in hydrocarbons such as polypropylene to inhibit oxidative deterioration. Such chalcones and flavanones are disclosed in an article by Wittmann and Uragg published in 1965 in *Monatsh. Chem.*, Vol. 96, page 381, which was referred to in *Chemical Abstracts*, Vol. 63, 6908G (1965).

SUMMARY

In accordance with the present invention, useful new substituted arylidene flavanones are provided having the formula:

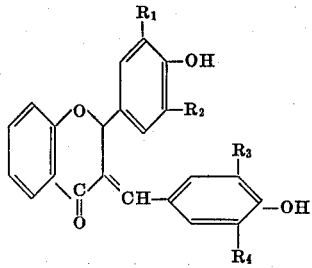

wherein $R_1$, $R_2$, $R_3$ and $R_4$ are alkyl groups of from one to four carbon atoms each.

It has been found that the substituted arylidene flavanones of the present invention are effective as oxidation inhibitors for hydrocarbon compositions. In particular, it has been found that oxidative degradation of substantially crystalline poly-1-olefins such as polypropylene is minimized. Furthermore, deterioration in the presence of metals such as copper normally encountered in the use of polypropylene as electrical insulation is surprisingly low.

DESCRIPTION OF THE PREFERRED EMBODIMENTS

The preferred substituted arylidene flavanones according to the present invention are those having branched chain alkyl groups such as isopropyl and tertiary butyl groups, particularly the latter in at least one of the $R_1$, $R_2$, $R_3$, and $R_4$ positions.

The substantially crystalline poly-1-olefins such as polypropylene containing the substituted chalcones and flavanones as employed in this invention may also contain additional oxidation inhibitors such as the dialkylthiodipropionates containing from one to 18 carbon atoms in the alkyl groups. Example include dimethylthiodipropionate, dilaurylthiodipropionate, disteareodithiopropionate, and the like.

Substituted arylidene flavanones having the formula of the compounds of the invention and which were found to improve the oxidative stability of polypropylene include a large variety as shown by Table I:

TABLE I

| $R_1$ | $R_2$ | $R_3$ | $R_4$ (as appropriate) |
|---|---|---|---|
| —CH₃ | —CH₃ | —CH₃ | —CH₃ |
| —CH₃ | —C(CH₃)₃ | —CH₃ | —C(CH₃)₃ |
| —CH(CH₃)₂ | —CH(CH₃)₂ | —CH(CH₃)₂ | —CH(CH₃)₂ |
| —C(CH₃)₃ | —C(CH₃)₃ | —C(CH₃)₃ | —C(CH₃)₃ |
| —CH₃ | —CH₃ | —C(CH₃)₃ | —C(CH₃)₃ |

Chalcone and flavanone precursors were prepared by the acid catalyzed condensation reaction between orthohydroxyacetophenone and a 4-hydroxy-3,5-dialkylbenzaldehyde.

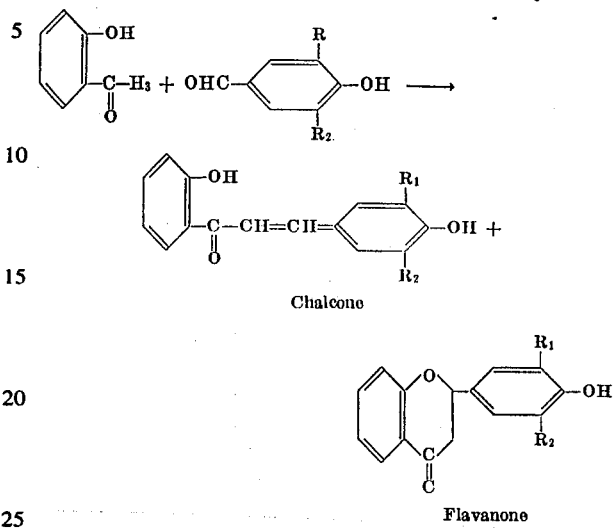

Chalcone

Flavanone

Arylidene flavanones of the invention were prepared from the flavanone precursor by reaction with another mol of the same or a different 4-hydroxy-3,5-dialkylbenzaldehyde.

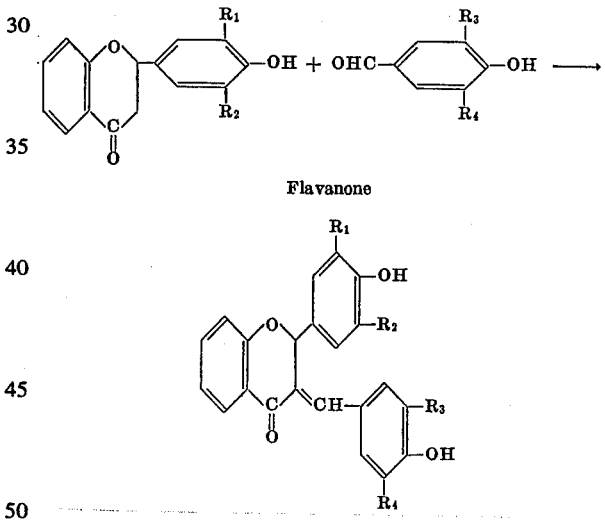

Flavanone

The following examples are given as illustrations of the substituted arylidene flavanones in accordance with the present invention. The proportions are on a weight basis unless otherwise specified.

Example 1

Preparation of 4-hydroxy-3,5-di-t-butylbenzaldehyde

Boric acid (17.5 g.) and hexamethylene tetramine (12.5 g.) were placed with 75 ml. of glycol in a 250 ml. Erlenmeyer flask equipped with magnetic stirrer. At 130°C. with rapid stirring, 150 g. of 2,6-di-t-butylphenol was added gradually and the reaction continued for an additional 30 minutes. A 30 percent solution of sulfuric acid (75 ml.) was then added and the mixture allowed to cool. The white needles that formed on crystallization were filtered and recrystallized from methanol to yield 13.0 g. of 4-hydroxy-3,5-di-t-butylbenzaldehyde m.p. 189°C.

Other 4-hydroxy-3,5-dialkylbenzaldehydes were prepared by the same reaction. These are given in Table II.

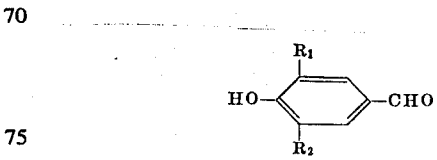

| Compound | R₁ | R₂ |
|---|---|---|
| 1-a | —H | —H |
| 1-b | —CH₃ | —CH₃ |
| 1-c | —CH₃ | —C(CH₃)₃ |
| 1-d | —CH(CH₃)₂ | —CH(CH₃)₂ |
| 1-e | —C(CH₃)₃ | —C(CH₃)₃ |

Examples 2 and 3

Preparation of 2'4-dihydroxy-3,5-di-t-butylchalcone and 4-hydroxy-3,5-di-t-butylflavanone A 100 ml. round bottom flask equipped with a stirrer, a thermometer, a gas inlet tube and a reflux condenser was charged with 75 ml. of absolute ethanol. Then HCl gas was bubbled through this alcohol for 10 minutes. The resulting solution was cooled to room temperature at which time 0.68 grams (5 m. moles) of orthohydroxy acetophenone and 1.17 grams (5 m. moles) of 4-hydroxy-3,5-di-t-butylbenzaldehyde was added. The reaction mixture was stirred for 2 hours and was then poured into 50 ml. of ice water. This aqueous solution was extracted three times with 30 ml. portions of ether. The ether extracts were washed with water, and then evaporated to about 10 ml. of volume. Pentane, 30 ml., was added to induce crystallization. The first crop of crystals, 0.35 grams, consisting of 3-(4-hydroxy-3,5-di-t-butylbenzylidene)-4'-hydroxy-3',5-di-t-butylflavanone, were isolated by filtration. Further concentration and cooling induced the precipitation of a second crop of crystals, weighing 0.61 grams, which were identified as 4-hydroxy-3,5-di-t-butylflavanone. Finally, a third crop of crystals was obtained by further concentration. This material weighed 0.35 grams and was identified as 2',4-dihydroxy-3,5-di-t-butylchalcone.

Other substituted chalcones and flavanones were prepared by a similar technique. Tables III AND IV list the compounds prepared in this way along with their analytical properties.

TABLE III

Substituted chalcones

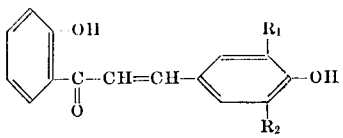

| Compound | R₁ | R₂ | Yield, percent | M.p. °C. | Analysis, percent C | H |
|---|---|---|---|---|---|---|
| 2-a | —H | —H | 62 | 158–9 | | |
| 2-b | —CH₃ | —CH₃ | 9 | 191–2 | 76.14 | 6.33 |
| 2-c | —CH₃ | —C(CH₃)₃ | 58 | 156–7 | 77.18 | 6.91 |
| 2-d | —CH(CH₃)₂ | —CH(CH₃)₂ | 18 | 145–6 | 77.74 | 7.31 |
| 2-e | —C(CH₃)₃ | —C(CH₃)₃ | 20 | 173–4 | 78.36 | 7.91 |

TABLE IV

Substituted flavanones

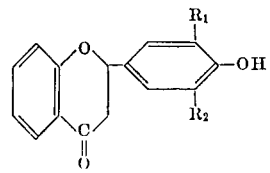

| Compound | R₁ | R₂ | Yield, R | M.p., °C. | Analysis, percent C | H |
|---|---|---|---|---|---|---|
| 3-a | —H | —H | 32 | 186–8 | | |
| 3-b | —CH₃ | —CH₃ | 19 | 174.5–5.5 | 76.12 | 6.10 |
| 3-c | —CH₃ | —C(CH₃)₃ | Insufficient for characterization | | | |
| 3-d | —CH(CH₃)₂ | —CH(CH₃)₂ | Insufficient for characterization | | | |
| 3-e | —C(CH₃)₃ | —C(CH₃)₃ | 35 | 139–40 | 78.01 | 7.93 |

Example 4

Preparation of 3-(4-hydroxy-3,5-di-t-butylbenzylidene)-4'-hydroxy-3',5'-dimethylflavanone A solution of 270 mg. of 2',4-dihydroxy-3,5-dimethylchalcone and 230 mg. of 4-hydroxy-3,5-di-t-butylbenzaldehyde in 50 ml. absolute ethanol saturated with dry hydrogen chloride was stirred at 80°C. for 1 hour and allowed to stand overnight. The product was precipitated by pouring the reaction mixture into 300 ml. of ice water. It was then filtered, washed three times with water and dried to yield 475 mg. of 3-(4-hydroxy-3,5-di-t-butylbenzylidene)-4'-hydroxy-3',5'-dimethylflavanone. An infrared spectrum showed the characteristic carbonyl band at 1,660 cm¹ for an arylidene flavanone.

Other alkyl substituted arylidene flavanones were prepared by similar condensations. These are listed in Table V.

TABLE V

Alkyl substituted arylidene flavanones

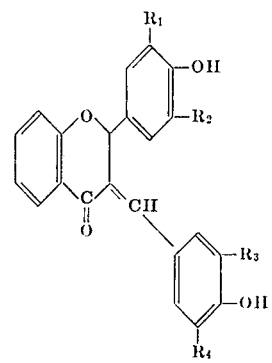

| Compound | R₁ | R₂ | R₃ | R₄ |
|---|---|---|---|---|
| 4-a | —H | —H | —H | —H |
| 4-b | —CH₃ | —CH₃ | —CH₃ | —CH₃ |
| 4-c | —CH₃ | —C(CH₃)₃ | —CH₃ | —C(CH₃)₃ |
| 4-d | —CH(CH₃)₂ | —CH(CH₃)₂ | —CH(CH₃)₂ | —CH(CH₃)₂ |
| 4-e | —C(CH₃)₃ | —C(CH₃)₃ | —C(CH₃)₃ | —C(CH₃)₃ |
| 4-f | —CH₃ | —CH₃ | —C(CH₃)₃ | —C(CH₃)₃ |

The alkyl substituted arylidene flavanones of this invention have shown ability to enhance the resistance of substantially crystalline polypropylene to oxidative degradation caused by exposure to the atmosphere, especially at elevated temperatures. Accordingly, these compounds are mixed homogeneously with such polypropylene at concentrations of at least about 0.05 weight percent, usually about 0.05 to 0.50 weight percent, based on the polypropylene, to enhance the oxidative stability of the polypropylene. This mixing may be achieved by blending the polymer and organic compound powders in conventional melt blenders. Minor amounts of other polymers, pigments, photostabilizers, other oxidation stabilizers, heat stabilizers, dye acceptors, dyes, fillers, and the like may also be incorporated into these mixtures.

The normally solid, substantially crystalline polypropylene which is stabilized by the compounds of this invention is a well known, commercial commodity. It is normally at least about 85 percent crystalline. It is essentially insoluble in refluxing heptane.

The compounds prepared as described in the above examples were tested as oxidative stabilizers for polypropylene by the following procedure. 0.050 g. of dilaurylthiodipropionate and 0.050 g. of the test compound (concentration A) were dissolved in acetone and poured into 10.0 g. of a commercial, unstabilized polypropylene powder. The slurry was stirred thoroughly until absolutely dry. The slurry was then mold pressed at 475°F. and up to 30,000 psi into a 20-mil sheet. This sheet was cut into 1-inch by 2-inch samples which were placed in an oven maintained at 138°C. Other samples were prepared in the same way, except that only 0.010 g. of test compound and 0.020 g. of dilaurylthiodipropionate were added as the stabilizer combination (concentration B). All of the oven samples were periodically examined by hand flexing to determine the time to failure due to embrittlement. The results are given in Table VI.

As shown in Table VI, Example 5, unmodified polypropylene has essentially no stability to high temperature oxidative conditions. The addition of 0.5% DLTDP, Example 6, increases this stability to 15 days. Examples 7 through 10 then show the further increase in stability effected by adding 0.5 percent of various compounds of this invention. Oven lifes of 20 to 40 days are obtained.

Example 11 compared to Example 5 shows that the polymer stability is decreased by one-half upon decreasing the concentration of DLTDP from 0.5 to 0.2 percent. However, upon adding only 1 percent of the test compound of this invention along with this concentration of DLTDP, oven lifes of 15 to 30 days are obtained, as shown by Examples 13, 14, 16, 17, 18, and 19. Examples 12 and 15 are included to show that no improvement in stability is obtained upon addition of unsubstituted chalcones or flavanones.

The compounds of this invention are especially useful in stabilizing polyolefin to metal catalyzed oxidative degradation, as occurs in the presence of catalyst residues or when the polyolefin is used as a metal coating. Table VII contains comparative data showing that these compounds are superior to some currently used commercial oxidative stabilizers.

TABLE VII

[Effect of chalcones and flavanones on the stability of polypropylene containing metal impurities [1]]

| Example number | Test compound [2] (example number) | Type | $R_1$ | $R_2$ | Metal ion [3] | Oven life at 138° C. (days) |
|---|---|---|---|---|---|---|
| 20 | DLTDP only | | | | $Cu^{++}$ | 0.1 |
| 21 | 2c | Chalcone | $-CH_3$ | $-C(CH_3)_3$ | $Cu^{++}$ | 12.3 |
| 22 | 4f | Flavanone | $-CH_3$ | $-CH_3$ | $Cu^{++}$ | 8.3 |
| 23 | Commercial D [4] | | | | $Cu^{++}$ | 0.3 |
| 24 | DLTDP only | | | | $Ti^{+++}Al^{+++}Na^+$ | 0.2 |
| 25 | 4c | Flavanone | $-C(CH_3)_3$ | $-C(CH_3)_3$ | $Ti^{+++}Al^{+++}Na^+$ | 7.0 |
| 26 | Commercial D [4] | | | | $Ti^{+++}Al^{+++}Na^+$ | 0.3 |

[1] All examples contain 0.2% dilaurylthiodipropionate.
[2] Test compounds were added at the 0.1% concentration.
[3] Copper ion present at a concentration of 0.05%. Titanium, aluminum, and sodium ions present at a concentration of 0.29%, 0.16%, and 0.22%, respectively.
[4] Commercial D is a 1,3-(3,5-di-tert.butyl-4-hydroxyphenoxy)-5-octylthiotriazine.

Examples 20 and 24 show that DLTDP stabilized polypropylene in the presence of a metal ion has essentially the same life as polypropylene in the absence of any stabilizers. This indicates the rapid deterioration of a polyolefin when in contact with metal ions. Examples 21, 22, and 25 show the large increase in stability resulting from adding 0.1 percent of the compounds of this invention. Examples 23 and 26 illustrate the poor improvement with one typical commercial prior art stabilizer. Other commercial materials or mixtures thereof, in contact with $Cu^{++}$, have oven lifes ranging from 0.1 to 16.0 days.

While the character of this invention has been described in detail with numerous examples, this has been done by way of illustration only and without limitation of the invention. It will be apparent to those skilled in the art that modifications and variations of the illustrative examples may be made in the practice of the invention within the scope of the following claims.

TABLE VI

Effect of chalcones and flavanones on the oxidative stability of polypropylene

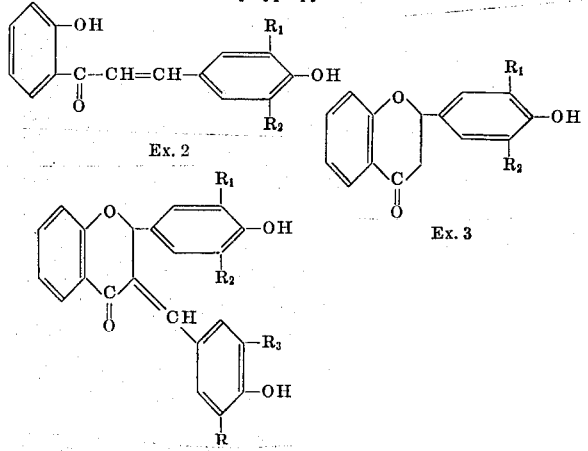

Ex. 2

Ex. 3

| Ex. No. | Test compound (Example number) | Stabilizer concentration [1] | $R_1$ | $R_2$ | $R_3$ | $R_4$ | Oven life at 136° C. (days) [3] |
|---|---|---|---|---|---|---|---|
| 5 | Unmodified PP | None | | | | | 0.1 |
| 6 | 0.5% DLTDP [2] only | do | | | | | 15.0 |
| 7 | 2b | A | $-CH_3$ | $-CH_3$ | | | 33.0 |
| 8 | 2c | A | $-C(CH_3)_3$ | $-C(CH_3)_3$ | | | 31.0 |
| 9 | 3c | A | $-C(CH_3)_3$ | $-C(CH_3)_3$ | | | 20.7 |
| 10 | 4c | A | $-C(CH_3)_3$ | $-C(CH_3)_3$ | | | 42.5 |
| 11 | 0.2% DLTDP [2] only | None | | | | | 8.0 |
| 12 | 2a | B | $-H$ | $-H$ | | | 9.9 |
| 13 | 2c | B | $-CH_3$ | $-C(CH_3)_3$ | | | 24.9 |
| 14 | 2d | B | $-CH(CH_3)_2$ | $-CH(CH_3)_2$ | | | 18.0 |
| 15 | 3a | B | $-H$ | $-H$ | | | 8.5 |
| 16 | 3b | B | $-CH_3$ | $-CH_3$ | | | 17.5 |
| 17 | 4b | B | $-CH_3$ | $-CH_3$ | $-CH_3$ | $-CH_3$ | 29.3 |
| 18 | 4c | B | $-CH_3$ | $-C(CH_3)_3$ | $-CH_3$ | $-C(CH_3)_3$ | 30.7 |
| 19 | 4f | B | $-CH_3$ | $-CH_3$ | $-C(CH_3)_3$ | $-C(CH_3)_3$ | 28.5 |

[1] Stabilizer concentration A: 0.5% dilaurylthiodipropionate and 0.5% test compound. Stabilizer concentration B: 0.2% dilaurylthiodipropionate and 0.1% test compound.
[2] Dilaurylthiodipropionate.
[3] Average of two specimens.

I claim:
1. A compound of the formula

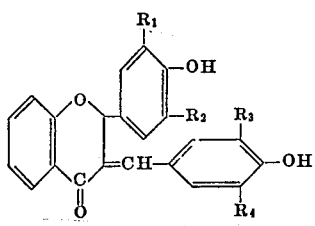

wherein $R_1$, $R_2$, $R_3$ and $R_4$ are alkyl groups of from one to four carbon atoms each.

2. A compound of the formula of claim 1 having branched chain alkyl groups in at least one of the $R_1$, $R_2$, $R_3$, and $R_4$ positions.

3. A compound of claim 2 having isopropyl or tertiary butyl groups in at least one of the $R_1$, $R_2$, $R_3$, and $R_4$ positions.

4. A compound of claim 3 having tertiary butyl groups in at least one of the $R_1$, $R_2$, $R_3$, and $R_4$ positions.

5. A compound of claim 4 having tertiary butyl groups in each of the $R_1$, $R_2$, $R_3$, and $R_4$ positions.

6. A compound of claim 4 having methyl groups in each of the $R_1$ and $R_2$ positions and tertiary butyl groups in each of the $R_3$ and $R_4$ positions.

* * * * *